United States Patent Office 3,080,093
Patented Mar. 5, 1963

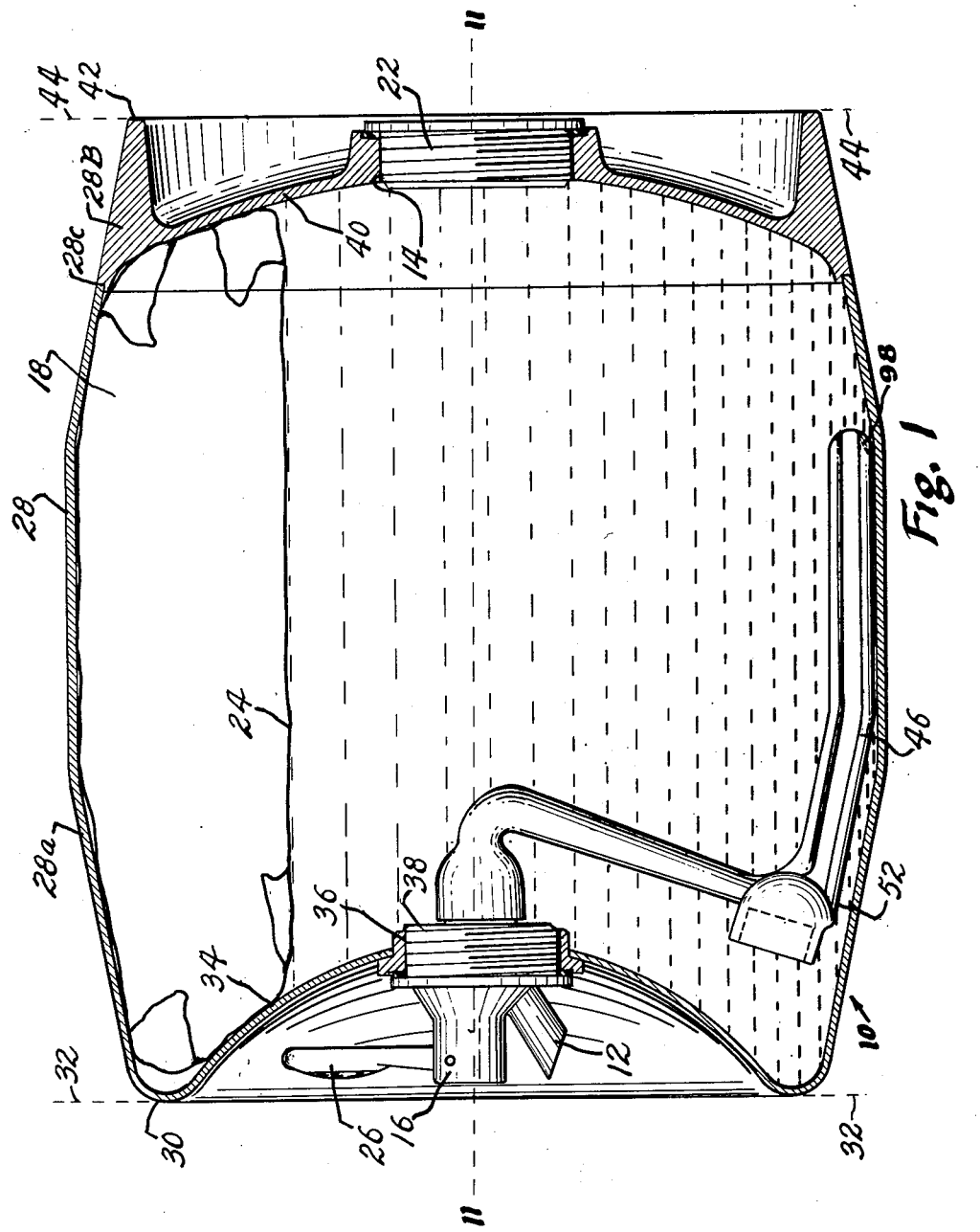

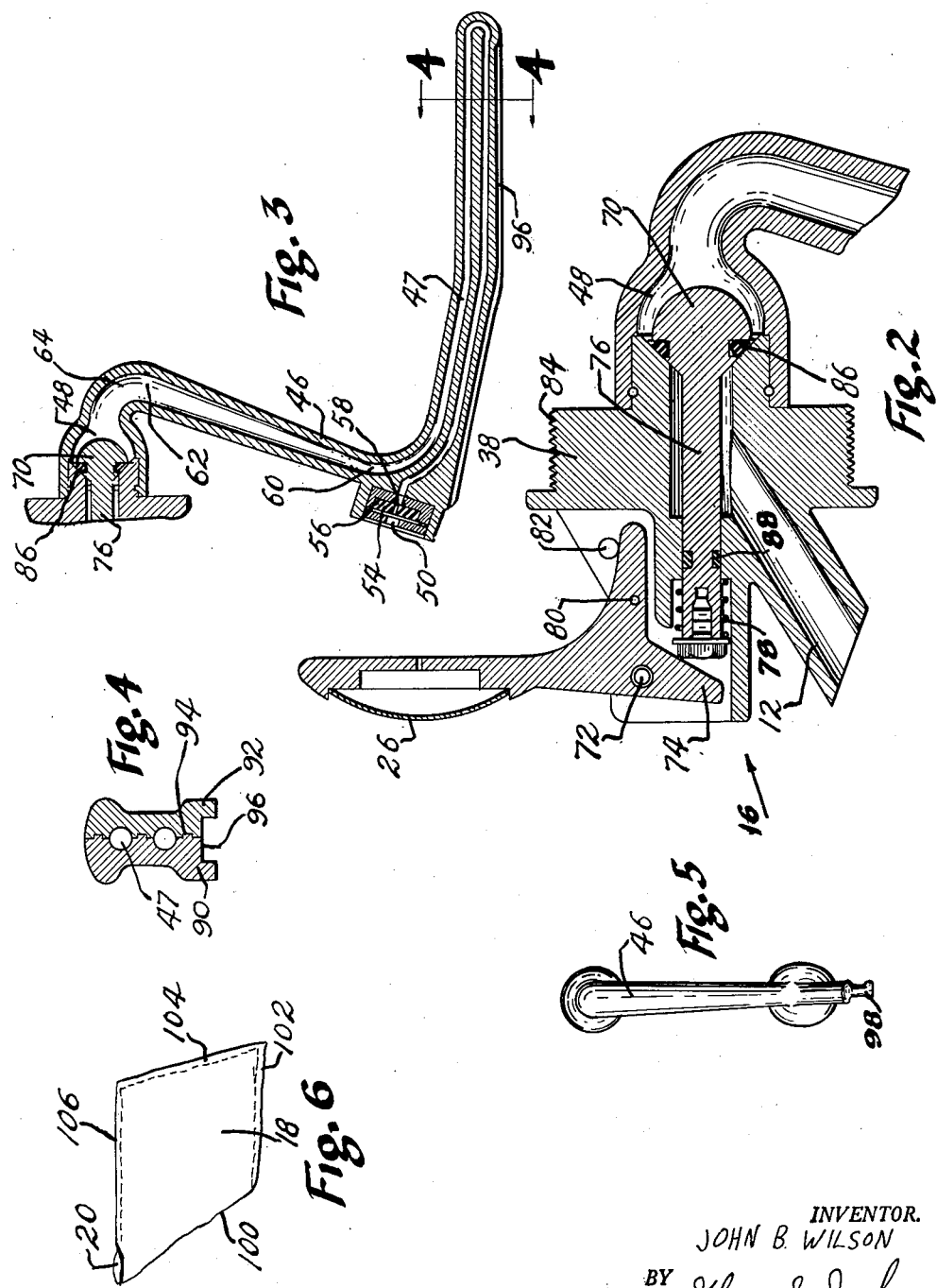

3,080,093
DISPENSING OF GAS CHARGED LIQUIDS
John B. Wilson, Chesterfield County, Va., assignor to Reynolds Metals Company, Richmond, Va., a corporation of Delaware
Filed Nov. 4, 1959, Ser. No. 850,929
8 Claims. (Cl. 222—1)

This invention relates to a method and apparatus for dispensing gas charged liquids, such as beer, carbonated beverages, and the like.

According to this invention, beer is introduced into a container, preferably metallic, with a sealed flexible bag which contains solid $CO_2$, or other propellant gas in any form, after which the container is sealed and stored in a refrigerator. The pressure on the beer produced by the propellant gas or sublimated $CO_2$ which is segregated in the flexible bag, is greater than the normal beer pressure produced by the normal amount of $CO_2$ absorbed or charged in the beer. The beer is periodically withdrawn from the container while it is in the refrigerator. While it is being withdrawn, a stream of said beer is substantially instantaneously reduced to a lower, substantially constant pressure, such as the normal beer pressure which is normally produced by the absorbed $CO_2$. This reduction in pressure produces a foaming action. However, the stream of beer is then maintained in contact with the foam produced by such substantially instantaneous reduction in pressure to produce a reabsorption or recharging of the $CO_2$ from the foam into the beer. The stream of beer is then further gradually reduced in pressure, a substantial amount, such as to atmospheric pressure, and is then discharged out of the container into a receptacle for drinking purposes and the like without the production of excessive foam.

For the sake of brevity the invention is generally described herein as applied to the dispensing of beer. However, it is to be understood that the invention is equally applicable to liquids other than beer and to absorbed gases in such liquids which may be $CO_2$ or other gases. Hence the specific description herein of beer is intended to be exemplary not only of beer but also of such other gas charged liquids, such as carbonated beverages and the like.

The container preferably is of a size to be stored in the usual bottle compartment of a domestic refrigerator. It may be made of aluminum, and may be keg-like in appearance.

The container may be provided with a discharge valve at one end to which is attached a foam absorbing or reabsorbing conduit which extends to a normally low position within the container and to which is attached a constant pressure reducing valve at the inlet of said conduit.

The discharge valve, foam absorbing conduit, and constant pressure valve preferably are insertable and removable as a unit from said container.

The container may have a guard rim forming means lying substantially within a plane which may be transverse to the longitudinal axis of the container, and the discharge valve may have an actuating handle which opens the valve only by outward movement of the handle, the handle being inward of said plane and protectively surrounded by said guard rim forming means to prevent accidental opening of the valve.

The discharge valve may have means to lock the same and means to receive a sealing wire to prevent unauthorized use of the same.

Accordingly, it is an object of this invention to provide an apparatus embodying one or more of the features of this invention.

Another object of this invention is to provide a method of storing and dispensing a gas charged liquid, which method embodies one or more of the features of this invention.

Other objects of this invention are apparent from this description of the invention and from the accompanying drawings, in which:

FIGURE 1 is a vertical cross-section of an embodiment of this invention.

FIGURE 2 is a vertical cross-section of the discharge valve, on a larger scale.

FIGURE 3 is a vertical cross-section of the foam absorbing or reabsorbing conduit and pressure reducing flow control valve.

FIGURE 4 is an enlarged cross-section along line 4—4 of FIGURE 3.

FIGURE 5 is a reduced elevation of the foam absorbing conduit and pressure reducing valve taken from the rightside in FIGURES 1 and 3.

FIGURE 6 is a perspective view of the flexible bag.

A container embodying this invention is shown in vertical cross-section in FIGURE 1 and is generally indicated by the arrow 10. It may be keg-shaped, and its outer walls may be made of aluminum containing material, such as commercial aluminum or suitable alloys thereof.

For brevity, this description will, at times, use such words as "vertical," "horizontal," etc., but it is to be understood that such words are used for brevity and convenience, and that the parts so described may have different positions, either temporarily or permanently, as is obvious.

The container 10 may be circular in transverse cross-section and may be of a size to be placed in the usual bottle compartment of a domestic refrigerator. It is usually placed in this compartment with its longitudinal axis 11—11 in a horizontal position, as shown in FIGURE 1. A spout, or valve discharge outlet 12 is downwardly directed to discharge the liquid, such as beer, into a glass, or other receptacle, for drinking purposes.

For example, and not by way of limitation, the receptacle 10 may be 10 inches maximum diameter, and 12 inches maximum length. It may have 700 cubic inches internal capacity.

The beer or other liquid is introduced through the bung opening 14.

To fill the container, the container 10 may be placed temporarily with its axis 11—11 in vertical position and with the discharge valve 16 at the bottom. For example, 520 cubic inches of beer are introduced into the container through the opening 14. Immediately after the beer has been introduced into the container, the flexible bag or propellant container 18, FIGURE 6, has solid $CO_2$ or "Dry Ice" introduced into the bag at the opening 20. For example, 38 grams of solid $CO_2$ may be introduced into the bag 18. The opening 20 is then quickly sealed by heat treatment, and the bag 18 is rolled up or folded and is also introduced through the opening 14 into the container 10 before the $CO_2$ has any chance materially to change into gaseous form.

The plug 22 is then quickly and loosely threaded into the opening 14. It is allowed to remain in this loosely inserted condition until the free gases from the beer start to ooze out around the plug 22, at which time the plug is tightly turned and sealed while the container is still in vertical position. This filling operation is performed at the brewery and the container is then ordinarily stored and refrigerated at the brewery ready for delivery to a customer.

When the refrigerated container with the beer and bag in it is delivered to a customer, it is placed in the usual bottle compartment of the domestic refrigerator with the axis 11—11 in horizontal position, as shown in FIGURE 1.

The beer (the word "beer" is being used as an example of gas charged liquids or beverages) reaches the level indicated by the line 24. The plastic bag 18 floats above the beer. The beer and all of the container and its parts are maintained continuously at a refrigerated temperature, such as between 32° F. and 50° F. This refrigerated condition of all of the parts aids in preventing excessive foam formation during the periodic withdrawal of the beer for drinking purposes.

At the time of delivery of the beer container 10 to the customer, the pressure effective as a pressure "head" on the beer in approximately 80 p.s.i., which pressure is due to the complete sublimation of the $CO_2$ in the bag 18 (which accounts for from 65 p.s.i. to 68 p.s.i. of the total "head"). The pressure of the $CO_2$ which is dissolved or absorbed by the beer itself during manufacture accounts for from 12 p.s.i. to 15 p.s.i. of the total "head" when the container is filled to its normal maximum capacity. The $CO_2$ which is absorbed in the beer is entirely independent and physically isolated from the $CO_2$ (or other propellant gas) which has been introduced into the bag 18.

When the user desires to serve beer from the container 10, the valve handle 26 is moved outward, i.e., to the left in FIGURE 1, and this opens the refrigerated valve 16 and delivers the beer through the refrigerated spout or outlet 12 into a glass or other receptacle.

When the glass is filled, the handle 26 is released and is closed in a manner to become more fully apparent.

The container 10 advantageously is keg-shaped and has a cylindraceous, closed perimeter, side wall 28 which has the longitudinal axis 11—11 in normally horizontal position within the refrigerator. The wall 28 has a valve end, circular, or closed perimeter guarding valve end rim 30 at its valve end, which rim 30 lies substantially in an end plane 32 which is substantially transverse to the axis 11—11. A discharge valve receiving countersunk end wall 34 joins and closes the side wall 28 at said rim 30. The end wall 34 is inwardly concave and lies inside the end plane 32 and has a valve receiving threaded opening 36 which receives the externally threaded end or inlet 38 of the valve 16 in countersunk position.

A beer or liquid and bag receiving countersunk bung end wall 40 closes the other end of the side wall 28. Another bung end rim structure 42, likewise circular or of closed perimeter construction, lies in plane 44, which is substantially transverse to axis 11—11, and the wall 40 preferably is countersunk inside said plane 44. The wall 40 has the liquid or beer and bag receiving opening 14, which is internally threaded and receives the externally threaded plug 22, with a flexible seal ring, as shown.

The discharge valve 16 is secured in the valve receiving opening 36 and lies entirely inside the plane 32. The actuating handle 26 opens the valve 16 only by outward (leftward in FIGURE 1) movement of said handle. The valve 16 has the liquid or beer outlet or spout 12 outside and the inlet 38 inside the end wall 34.

A refrigerated foam absorbing conduit construction 46 is inside the container 10 and has a foam absorbing conduit 47 with its outlet 48 connected to the inlet 38 of the valve 16. The conduit 47 has its inlet extending near a low position 52 within the container 10 in its normal position while in a refrigerator. A substantially constant discharge pressure reducing flow control valve 54 is connected at the inlet of the foam absorbing conduit 47.

The valve 54 has a rubberlike disk 56 with an opening 58 which receives liquid on its intake side 50 at varying pressures (within the working limits of the valve) and delivers such liquid at a substantially constant pressure on the discharge side (also within the working limits of the valve) into the inlet of conduit 47. Such a valve by itself is well known. An example thereof is disclosed in the U.S. Patent No. 2,454,929, granted November 30, 1948, to L. A. Kempton.

The conduit 47 is of substantially uniform cylindrical shape from its inlet to the point 60 where it tapers gradually outward at the rate of 4°, for example, to the point 62 from where it curves at 64 and flares at its outlet 48 to discharge into the inlet 38 of the valve 16.

The valve 54, for example, may be of the character which permits a flow through the orifice 58 at the rate of ¾ gallons per minute under the conditions of this invention. It substantially instantaneously reduces the pressure of the beer from a head pressure of as much as 80 p.s.i. and discharges the beer at a substantially constant pressure of from 12 to 15 p.s.i. (pounds per square inch) into conduit 47 when the container is filled to its normal maximum capacity. The conduit 47 may be 11 inches long from the inlet to the point 60 and may be .086 inch in diameter. Thereafter it may taper outwardly for a distance of approximately four inches to a diameter of .312 inch more or less substantially at the point 62, after which it may remain more or less uniform in diameter until it flares at its outlet 48.

The beer pressure in conduit 47 gradually reduces, during the draw, from about 12 to 15 p.s.i. at the inlet of conduit 47 to 7 or 8 p.s.i. at point 60, and then gradually decreases substantially to atmospheric pressure at the outlet 48, so that it is discharged through the valve 16 and out the outlet spout 12 under refrigerated and quiet conditions with an unobjectionable or negligable amount of foam.

At the "full" condition of container 10 the total head on the beer, as previously stated, is approximately 80 p.s.i. When the container is substantially empty of beer, the pressure head acting on the beer is from 12 p.s.i. to 15 p.s.i., and sometimes as low as 8½ p.s.i., depending on varying conditions. The pressures above 15 p.s.i. ordinarily produce heavy foaming of the beer discharged through a valve spout, unless the precautions of this invention are taken to prevent such foaming.

The valve 16 has a semispherical valve head 70 which opens rightward in FIGURE 2 with a quick action due to the sudden release of high static beer pressure when the top of the handle 26 is pulled with a strong enough pull to produce the initial opening of the valve. The handle 26 is fulcrumed at 72 so lever 74 pushes against stem 76 against the action of compression spring 78. The valve head 70 yields suddenly and the strong pull of the handle 26 sufficient to produce the first slight opening movement which moves the head 70 quickly to fully open position, practically with a snap action. This presents a fully open valve to the beer and prevents undue agitation which otherwise might produce a foaming action. Release of handle closes valve 16 through the action of spring 78.

The handle 26 has an opening 80 for the reception of a seal wire, which also passes through the stationary part of the valve so the customer may be assured that he receives a full container of beer. An opening 82 is provided in the stationary part of the valve for the reception of a padlock to prevent unauthorized opening of the valve. The valve is threaded at 84 for insertion into the opening 36 of the wall 34, FIGURE 1. The valve 16 has O-ring 86 of rubberlike material and stem packing 88.

The valve 16, conduit construction 46, and valve 54 may be inserted and removed as a unit through opening 36. The shape of the conduit construction 46 follows closely the end wall 34 and the side wall 28 so the bag 18 may expand as the beer with withdrawn without danger of being punctured or arrested in its downward movement.

The conduit construction 46 may be made of two pieces 90 and 92, FIGURE 4, which are molded of suitable plastic material such as nylon (Dupont "Zytel" #31, for example). These pieces 90 and 92 are dovetailed at 94 and cemented together. A drain channel 96 and drain conduit 98 are provided to drain the slight amount of or wash liquid remaining in the container out through opening 14. The wall 40 is outwardly bulged to aid in this draining operation.

The side wall 28 may be made of two wall shaped or cupped pieces 28a and 28b, which may be welded together at their edges at the side wall circumferential seam 28c. The cuped metal piece 28a has a reverse ring shaped bend at 30 where the side wall 28 is joined to the valve end wall 34.

The plastic or flexible bag 18 may be made of transparent plastic sheet material, such as Milar, manufactured by the E. I. Du Pont de Nemours and Company. The bag 18 is a single piece of sheet of Milar folded at 100 and coated on the inside with polyethylene. It is heat sealed along the edges 102, 104 and 106 except at the short opening 20 near the fold 100 through which the Dry Ice is introduced. When folded, as in FIGURE 6, the edges 102 and 106 may be 16 inches long, and the edges 100 and 104 may be 22 inches long. The bag is rolled or pleated, with the edge 102 as the axis, if desired, and is introduced into the opening 14, as previously described.

In the operation of the invention, a gas charged liquid, such as beer, is introduced through opening 14 into the receptacle 10 while said receptacle is in a vertical position with the valve 16 down. A propellant gas, such as $CO_2$, in solid form, is quickly introduced into the opening 20 of the bag 18 and the opening 20 is then quickly heat sealed, and the bag and $CO_2$ are quickly introduced into the container 10 through the opening 14. The plug 22 is then loosely threaded in the opening 14, and allowed to remain until the free gas from the beer oozes out around the plug 22. The plug is then tightened to seal opening 14. The container is then refrigerated and stored at the brewery until it is delivered to the customer's refrigerator when desired. The container 10 is then placed in the bottle compartment of the refrigerator with the axis 11—11 in horizontal position. The propellant gas, such as sublimated $CO_2$ in the bag, then produces a pressure head on the beer. When beer is to be drawn, the valve 16 is opened so a stream of beer enters the opening 58 and is almost instantaneously reduced in pressure to a substantially constant lower pressure. This produces foam in the stream of beer. Thereafter the stream of beer, with the foam thus produced, travels through the foam reabsorbing conduit 47 where the foam is reabsorbed and the beer pressure is gradually reduced in pressure further, substantially to atmospheric pressure, after which it is discharged through the fully opened valve 16 and out the spout 12 into a drinking receptacle. The bag 18 is sufficiently larger so it can unfold or expand to occupy the entire space in the container 10 which is vacated by the beer as it is withdrawn. In this manner the pressure of the propellant gas is always effective on the upper surface of the beer until all possible beer has been withdrawn from the container.

Because of the method of pressure reduction and reabsorption of the foam within the container 10, excessive foaming in the drinking receptacle is prevented.

A new and improved method and apparatus for dispensing fluids under propellant gas pressure are thus provided.

While the form of the invention now preferred has been disclosed as required by the statutes, other forms may be used, all coming within the scope of the claims which follows.

What is claimed is:

1. A gas charged liquid storing and dispensing container comprising: a closed perimeter side wall having a longitudinal axis normally horizontal when said container is stored in a refrigerator and having a valve end closed perimeter guard rim at its valve end, said rim lying substantially in an end plane transverse to said longitudinal axis; a discharge valve receiving end wall joining and closing said side wall at said rim, said valve receiving end wall lying inside said end plane and having a valve receiving opening; a liquid and bag receiving end wall closing the other end of said side wall, said liquid and bag receiving end wall having a liquid and bag receiving opening; a discharge valve secured in said valve receiving opening and lying entirely inside said plane, said valve having an actuating handle opening said valve by outward movement of said handle, said valve having a liquid outlet outside and a liquid inlet inside said valve receiving end wall; a foam absorbing conduit inside said container and having its outlet connected to said inlet of said valve, said conduit having its inlet extending near a low position within said container while in normal position in said refrigerator; a substantially constant discharge pressure reducing flow control valve at said inlet of said foam absorbing conduit; a flexible propellant gas containing bag insertable into said liquid and bag receiving opening with the liquid to be dispensed from said container, said bag floating above said liquid; and a closing plug for said liquid and bag receiving opening.

2. A beer storing and dispensing container comprising: a cylindraceous side wall having a longitudinal axis normally horizontal when said container is stored in a refrigerator and having a valve end closed perimeter guard rim at its valve end, said rim lying substantially in an end plane transverse to said longitudinal axis; a discharge valve receiving end wall joining and closing said side wall at said rim, said valve receiving end wall lying inside said end plane and having a valve receiving opening; a beer and bag receiving end wall closing the other end of said wall, said beer and bag receiving end wall having a beer and bag receiving opening; a discharge valve secured in said valve receiving opening anl lying entirely inside said plane, said valve having an actuating handle opening said valve by outward movement of said handle, said valve having a beer outlet outside and a beer inlet inside said valve receiving end wall; a foam absorbing conduit inside said container and having its outlet connected to said inlet of said valve, said conduit having its inlet extending near a low position adjacent said side wall within said container while in normal position in said refrigerator; a substantially constant discharge pressure reducing flow control valve at said inlet of said foam absorbing conduit; a flexible propellant gas containing bag insertable into said beer and bag receiving opening with the beer to be dispensed from said container, said bag floating above said liquid; and a closing plug for said beer and bag receiving opening.

3. A container according to claim 2 in which said conduit extends down adjacent said valve receiving end wall and then extends along the lower portion of said side wall when said container is in normal position in said refrigerator, to permit downward expansion of said bag as said beer is withdrawn from said container.

4. A keg-shaped beer storing and dispensing container comprising: a cylindraceous side wall having a longitudinal axis normally horizontal when said container is stored in a refrigerator; a discharge valve receiving end wall closing said side wall at one end; a beer and bag receiving end wall joining and closing said side wall at the other end and having a beer and bag receiving opening; a discharge valve secured in said valve receiving opening said valve having an actuating handle opening and closing said valve by movement of said handle, said valve having a beer outlet outside and a beer inlet inside said valve receiving end wall; a foam absorbing conduit inside said container and having its outlet connected to said inlet of said valve and having its inlet extending near a low position within said container while in normal position; a substantially constant discharge pressure reducing flow control valve at said inlet of said foam absorbing conduit; a flexible propellant gas containing bag insertable into said beer and bag receiving opening with the beer to be dispensed from said container; and a closing plug for said beer and bag receiving opening.

5. A container according to claim 4 in which said conduit extends down adjacent said valve receiving end wall and then extends along the lower portion of said side wall when said container is in normal position in said refrigerator, to permit downward expansion of said bag as said beer is withdrawn from said container.

6. An effervescent liquid storing and dispensing container having a fluid tight outer wall structure, a discharge valve secured to said outer wall structure with a liquid discharge opening and an actuating handle outside said wall structure and with a liquid valve inlet, a foam absorbing conduit mainly inside said container having its outlet connected to said valve inlet and having its conduit inlet extending near a normally low position within said container, a substantially constant discharge pressure reducing flow control device at and discharging into said foam absorbing conduit inlet, means to introduce an effervescent liquid into said container, and a flexible bag in said container with a propellant gas in said bag.

7. A method of storing and dispensing beer which comprises: introducing said beer into a container with a sealed flexible bag containing solid $CO_2$; sealing said container; storing said container, beer, bag and $CO_2$ gas in a refrigerator with a pressure on said beer liquid produced by sublimation of said solid $CO_2$ above the normal beer pressure produced by the normal amount of $CO_2$ absorbed in said beer; and periodically withdrawing beer from said container while it is in said refrigerator by substantially instantaneously reducing the pressure of a stream of said beer substantially to said normal beer pressure; maintaining said stream in contact with the foam produced by said reduction of pressure while gradually further reducing the pressure of said stream substantially to atmospheric pressure, and then discharging said stream out of said container into a receptacle.

8. A method of storing and dispensing a gas charged liquid which comprises: introducing said liquid into a container with a sealed flexible bag containing a propellant gas; sealing said container; storing said container, liquid, bag and gas in a refrigerator with a pressure on said liquid produced by said propellant gas above the normal liquid pressure produced by the normal amount of gas charged in said liquid; and periodically withdrawing liquid from said container while it is in said refrigerator by substantially instantaneously reducing the pressure of a stream of said liquid substantially to said normal liquid pressure, maintaining said stream in contact with the foam produced by said reduction of pressure while gradually further reducing the pressure of said stream substantially to atmospheric pressure, and then discharging said stream out of said container into a receptacle.

References Cited in the file of this patent
UNITED STATES PATENTS

| | | |
|---|---|---|
| 445,257 | Beck | Jan. 27, 1891 |
| 609,970 | Lochmann | Aug. 30, 1898 |
| 1,155,984 | Wray | Oct. 5, 1915 |
| 1,191,882 | Fairbanks | July 18, 1916 |
| 1,959,815 | Corcoran | May 22, 1934 |
| 2,008,642 | Hughes | July 16, 1935 |
| 2,305,286 | Ward | Dec. 15, 1942 |
| 2,454,929 | Kempton | Nov. 30, 1948 |
| 2,514,773 | Kromer | July 11, 1950 |
| 2,689,768 | Falligant | Sept. 21, 1954 |
| 2,872,083 | Murphy et al. | Feb. 3, 1959 |
| 2,873,051 | Hamburg et al. | Feb. 10, 1959 |
| 2,954,935 | Stearns et al. | Oct. 4, 1960 |